United States Patent
Suda (10) Patent No.: US 8,477,187 B2
(45) Date of Patent: Jul. 2, 2013

(54) IMAGING APPARATUS AND PAN/TILT HEAD CONTROL METHOD

(75) Inventor: Hirofumi Suda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 530 days.

(21) Appl. No.: 12/043,678

(22) Filed: Mar. 6, 2008

(65) Prior Publication Data

US 2008/0246847 A1    Oct. 9, 2008

(30) Foreign Application Priority Data

Apr. 6, 2007  (JP) .................. 2007-100918

(51) Int. Cl.
*H04N 7/18* (2006.01)
(52) U.S. Cl.
USPC .............. 348/143; 348/211.3; 348/211.99
(58) Field of Classification Search
USPC .................. 348/208.3, 143, 211.99, 211.3
See application file for complete search history.

(56) References Cited

U.S. PATENT DOCUMENTS

| 2002/0044214 A1* | 4/2002 | Hovanky ................ 348/373 |
| 2004/0056964 A1* | 3/2004 | Kawai et al. ............. 348/211.1 |
| 2008/0094480 A1* | 4/2008 | Swarr et al. ............. 348/211.99 |

FOREIGN PATENT DOCUMENTS

| JP | 2003-098576 | * | 4/2003 |
| JP | 2003-098576 A | | 4/2003 |

* cited by examiner

*Primary Examiner* — Sinh Tran
*Assistant Examiner* — Paul Berardesca
(74) *Attorney, Agent, or Firm* — Canon USA Inc IP Division (57) ABSTRACT

In an imaging apparatus, when a pan/tilt head is located at a predetermined position, a photographed image acquired by an imaging unit is stored as a registered image. A photographed image, which is newly acquired by the imaging unit, is compared with the registered image when the pan/tilt head is not driven from the predetermined position after the registered image is stored. The pan/tilt head is driven to an initial position if, as a result of comparison between the photographed image and the registered image, it is determined that a degree of matching between the photographed image and the registered image satisfies a predetermined condition.

9 Claims, 10 Drawing Sheets

| NO. | COMMAND | PARAMETER |
| --- | --- | --- |
| 1 | UPWARDLY TILT PAN/TILT HEAD | TILT AMOUNT, SPEED |
| 2 | DOWNWARDLY TILT PAN/TILT HEAD | TILT AMOUNT, SPEED |
| 3 | PAN PAN/TILT HEAD RIGHT | PANNING AMOUNT, SPEED |
| 4 | PAN PAN/TILT HEAD LEFT | PANNING AMOUNT, SPEED |
| 5 | PERFORM PRESET STORAGE OF PAN POSITION, TILT POSITION, FOCUS DATA, ZOOM POSITION AND PRESET IMAGE | PRESET NO. |
| 6 | CHANGE STATE OF PAN/TILT HEAD TO PRESET STATE | PRESET NO. |
| 7 | START TRANSMISSION OF MOVING IMAGE | IMAGE SIZE, COMPRESSION RATE, FRAME RATE |
| 8 | STOP TRANSMISSION OF MOVING IMAGE | |

IMAGING APPARATUS AND PAN/TILT HEAD CONTROL METHOD

BACKGROUND OF THE INVENTION

1. Field of the Invention

The present invention relates to an imaging apparatus configured to perform imaging in a specific direction by driving a pan/tilt head, and a pan/tilt head control method.

2. Description of the Related Art

Monitoring camera systems have been made available which monitor images and control cameras by remote control via a network and a dedicated line in order to prevent crime and to ensure safety. Such a system remotely controls a camera so as to control not only the auto-focus (AF), zoom, exposure, white-balance, resolution, and imaging frame-rate of the camera but the photographing direction of the camera supported by a pan/tilt head.

An example of application of such a monitoring camera system is a real-time manned image monitoring system. In this case, an observer can freely control a pan/tilt head in a tilting direction and in a panning direction from a remote location while observing an image displayed on a monitor, such as a personal computer (PC) monitor or a television (TV) monitor, in real time. Consequently, a desired photographing angle and a desired angle of view can be obtained. An observer can monitor an object by quickly switching scenes of the object by preliminarily registering a plurality of preset positions respectively corresponding to a set of a predetermined photographing direction and a predetermined angle of view.

Another example of application of such a monitoring camera system is a real-time unmanned image monitoring system. In this case, the system automatically photographs still images and moving images with a camera. Then, the system transmits the photographed images to a remote location and records the photograph images in a video tape recorder or a hard disk recorder placed at the remote location. The system can record, while switching scenes, photographed images by changing photographing conditions, such as a photographing direction, to preset conditions corresponding to preset positions at preset specific times or at regular time intervals.

In a case where a pan/tilt head is iteratively moved, enhancement of precision in stopping the pan/tilt head is required. Japanese Patent Application Laid-Open No. 2003-98576 discusses an imaging apparatus that registers preset positions together with images respectively corresponding the preset positions and that compares an actual image, which is photographed when stopping the pan/tilt head at each preset position, with the image registered corresponding to the associated preset position so as to correct an image deviation amount at each preset stopping position.

However, the above-described imaging apparatus has some disadvantages. Generally, accurate positioning control can be easily achieved using a stepping motor. Accordingly, a stepping motor is used in a drive mechanism of the pan/tilt head so as to perform fine control of the position of the pan/tilt head. In the case of using a stepping motor, the positioning control of the absolute position of the pan/tilt head is performed by counting drive pulses of the stepping motor and using a specific initial position as a reference position.

Nevertheless, in the case of the pan/tilt head using a stepping motor, for example, when the pan/tilt head is intentionally and manually moved, or when the pan/tilt head is caught in something, the initial position is changed, thereby throwing off the count value of drive pulses of the stepping motor. Accordingly, the designation of the absolute position of the pan/tilt head may become considerably inaccurate. Particularly, the photographing direction of the camera supported by the pan/tilt head, which is placed within arm's reach, is highly likely to be intentionally changed.

When the designation of the absolute position of the pan/tilt head becomes considerably inaccurate, an amount of deviation of the position of the pan/tilt head cannot be detected. Consequently, the image deviation position at each stopping position of the pan/tilt head of the conventional imaging apparatus cannot be corrected.

In addition, not only in the case where the pan/tilt head is automatically moved to the preset position, but in a case where the pan/tilt head is manually and freely controlled, it is necessary to detect that the position of the pan/tilt head is considerably deviated.

SUMMARY OF THE INVENTION

The present invention is directed to an imaging apparatus capable of preventing an imaging operation directed to a user's unintended photographing direction, and to a control method for controlling a pan/tilt head of the imaging apparatus.

According to an aspect of the present invention, an imaging apparatus includes an imaging unit configured to acquire a photographed image from an optical image, a pan/tilt head configured to support the imaging unit, a drive unit configured to drive the pan/tilt head with an initial position of the pan/tilt head set as a reference position, an image storage unit configured to store, as a registered image, the photographed image acquired by the imaging unit when the pan/tilt head is located at a predetermined position, and an image comparison unit configured to compare a photographed image newly acquired by the imaging unit with the registered image stored in the image storage unit when the pan/tilt head is not driven from the predetermined position after the registered image is stored in the image storage unit. The drive unit drives the pan/tilt head to the initial position if, as a result of comparison made by the image comparison unit, it is determined that a degree of matching between the photographed image and the registered image satisfies a predetermined condition.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Imaging apparatuses according to exemplary embodiments of the present invention are applied to monitoring camera systems that remotely control cameras via networks and dedicated lines and that monitor images photographed by the cameras.

First Exemplary Embodiment

Figure 1:
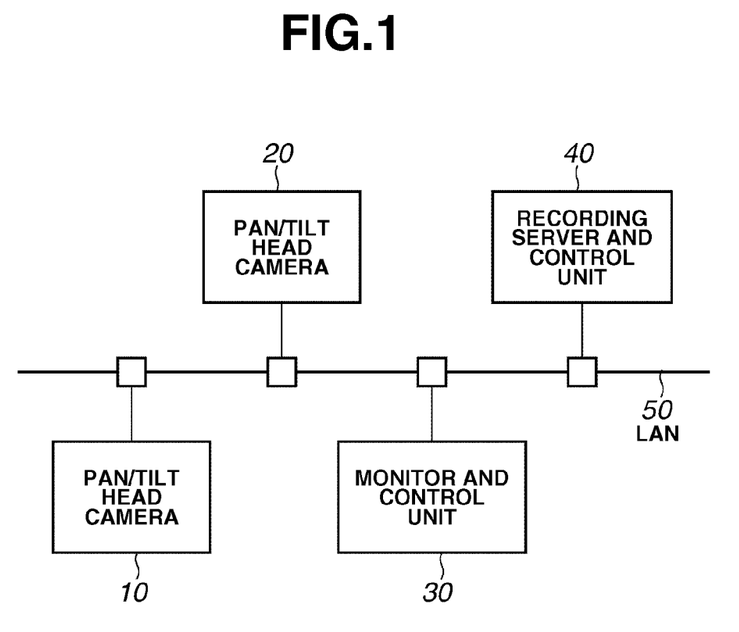
FIG. 1 illustrates an example configuration of a monitoring camera system according to a first exemplary embodiment of the present invention.

FIG. 1 illustrates an example configuration of a monitoring camera system according to a first exemplary embodiment of the present invention. The monitoring camera system includes a plurality of pan/tilt head cameras 10 and 20, a monitor and control unit 30, and a recording server and control unit 40, which are connected to one another via a local area network (LAN) 50.

The pan/tilt head cameras 10 and 20 serve as monitoring cameras. For example, the pan/tilt head cameras 10 and 20 photograph moving images and still images, and transmit and output the photographed images and video signals to external devices via the LAN 50. In addition, the pan/tilt head cameras 10 and 20 record signals on various recording media, such as tape, a solid-state memory, an optical disk, and a magnetic disk.

The monitor and control unit 30 is a terminal for manually performing monitoring and control operations. A user can control the pan/tilt head cameras 10 and 20 while observing images displayed on a monitor of the monitor and control unit 30.

The recording server and control unit 40 is a terminal for enabling unmanned monitoring operations. The recording server and control unit 40 includes a central processing unit (CPU) that executes internally-stored control programs. Thus, the recording server and control unit 40 controls the pan/tilt head cameras 10 and 20 and records video signals in a recording server.

The number of pan/tilt head cameras, that of monitor and control units, and that of recording server and control units are not limited to those of such elements illustrated in FIG. 1 and can be set at given values according to use intended by a user. The configuration of the network is not limited to that according to the present exemplary embodiment. The network can include a dedicated line and a virtual private network (VPN). Video cameras and digital still cameras can be used as the pan/tilt head cameras 10 and 20.

Figure 2:
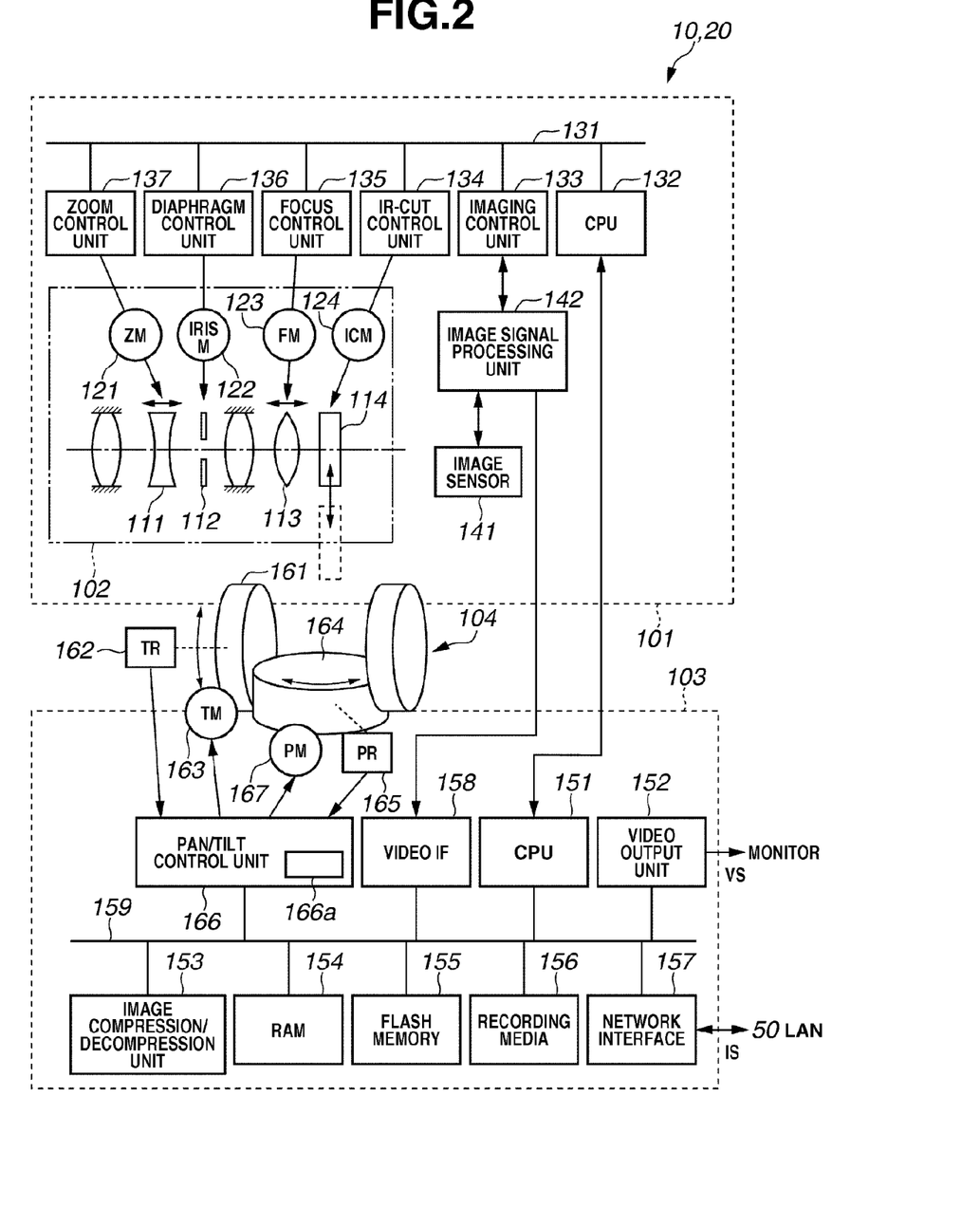
FIG. 2 illustrates an example configuration of a pan/tilt head camera of the monitoring camera system illustrated in FIG. 1.

FIG. 2 illustrates an example configuration of the pan/tilt head camera 10 or 20 of the monitoring camera system illustrated in FIG. 1. The pan/tilt head camera 10 or 20 includes an imaging unit 101, a pan/tilt head 104, and a base unit 103. The pan/tilt head 104 includes a panning mechanism unit 164 and a tilting mechanism unit 161. The imaging unit 101 acquires a photographed image from an optical image and can freely change a photographing direction by performing a pan/tilt operation. The base portion 103 incorporates a control unit that controls the imaging unit 101. The panning mechanism unit 164 is fixed to the base unit 103 and drives the imaging unit 101 in a horizontal direction (panning direction). The tilting mechanism unit 161 connects the panning mechanism unit 164 to the imaging unit 101 and drives the imaging unit 101 in a vertical direction (tilting direction).

The imaging unit 101 includes a lens unit 102, an image sensor 141, an image signal processing unit 142, a central processing unit (CPU) 132, and various units that are connected via a bus 131 to and are controlled by the CPU 132. The units connected via the bus 131 to the CPU 132 include an imaging control unit 133, an infrared-cut (IR-CUT) control unit 134, a focus control unit 135, a diaphragm control unit 136, and a zoom control unit 137.

The base unit 103 includes a CPU 151 and diverse units that are connected via a bus 159 to and are controlled by the CPU 151. The diverse units controlled by the CPU 151 include a video output unit 152, an image compression/decompression unit 153, a random access memory (RAM) 154, a flash memory 155, recording media 156, a network interface (IF) 157, a video IF 158, and a pan/tilt control unit 166. The CPUs 132 and 151 communicate with each other and cooperate with each other in information exchange and timing-synchronization.

The lens unit 102 includes a zoom lens 111, a diaphragm 112, and a focus lens 113. Light from an object is formed into an image on the image sensor 141 through these optical members. Thus, imaging of an object is performed. An optical image formed on the image sensor 141 is photoelectrically converted into an electrical image signal, which is processed by the image signal processing unit 142. The image signal is sent to the video IF 158 in the base unit 103.

The imaging control unit 133 sets an imaging resolution of the image sensor 141, a method for reading an image signal, a frame rate, and so on. The image signal processing unit 142 performs image signal processing according to a resolution, a frame rate, and ON/OFF conditions of an IR-CUT filter 114, which are designated by the imaging control unit 133.

The IR-CUT filter 114 is driven by an infrared-cut filter drive Motor (ICM) 124 in response to an instruction issued by the IR-CUT control unit 134. Thus, the IR-CUT filter 114 advances into and retreats from an optical path of the lens unit 102. In a state in which the IR-CUT filter 114 advances into the optical path of the lens unit 102, no infrared light is included in light formed into an image of an object on the image sensor 141. In a state in which the IR-CUT filter 114 retreats from the optical path of the lens unit 102, infrared light is included in light formed into an image of an object on the image sensor 141.

The focus control unit 135 controls a focus motor (FM) 123 according to an image signal AF evaluation value obtained by the image signal processing unit 142. Thus, the focus control unit 135 drives the focus lens 105 to perform an AF operation.

The diaphragm control unit 136 controls a diaphragm motor (IRISM) 122 according to a photometric evaluation value obtained by performing image signal processing and to operating conditions of the image sensor 141, which are set by the imaging control unit 133. Thus, the diaphragm control unit 136 drives the diaphragm 112 to perform an automatic exposure control operation.

The zoom control unit 137 controls a zoom motor (ZM) 121 according to an instruction issued by the CPU 132 to drive the zoom lens 111.

The image signal processed by the image signal processing unit 142 is sent to the video IF 158 as a signal representing image data. The image signal sent thereto is temporarily stored in the RAM 154. The image signal stored in the RAM 154 is compressed by the image compression/decompression unit 153. An image represented by the compressed image signal is recorded as a registered image on the recording media 156 serving as an image storage unit. The image signal stored in the RAM 154 is transmitted as a network signal IS to external devices via the network IF 157. The image signal stored in the RAM 154 is output by the video output unit 152 as a video signal VS for a TV monitor or a PC monitor. Image data recorded on the recording media 156 is decompressed by the image compression/decompression unit 153 into the RAM 154, if necessary. An image represented by the decompressed image data is used as a stored image Q (see FIG. 7) to be compared with a photographed image, as will be described later. Preset pan/tilt, zoom, and focus information is stored in the recording media 156 in addition to the image data. Generally, a flash memory, a RAM, and a hard disk are used as the recording media 156. However, a magnetic tape and an optical disk can be used as the recording media 156.

The panning mechanism unit 164 is driven by a pan motor (PM) 167, which is controlled according to an instruction issued by the pan/tilt control unit 166. The tilting mechanism unit 161 is driven by a tilt motor (TM) 163, which is controlled according to an instruction issued by the pan/tilt control unit 166. A stepping motor can be used as each of the pan motor 167 and the tilt motor 163. Initial positions of the pan motor 167 and the tilt motor 163 are detected by a pan reset sensor (PR) 165 and a tilt reset sensor (TR) 162, respectively. Each of the pan reset sensor 165 and the tilt reset sensor 167 outputs a signal whose signal level changes from an on-level to an off-level (or from the off-level to the on-level) when a rotor of the associated one of the motors 163 and 167 passes through an initial angular position (see FIG. 5). An encoder, whose value is reset to "0" at an initial position, can be used instead of each of the reset sensors 162 and 165.

A counter 166a is provided in the pan/tilt control unit 166. An absolute position of the pan/tilt head 104 is controlled by incrementing or decrementing the counter 166a.

When receiving an instruction from the CPU 151, the CPU 132 controls each unit provided in the imaging unit 101. When receiving various camera control commands from control terminals, such as the monitor and control unit 30 and the recording server and control unit 40, via the network (LAN) 50, the CPU 151 sends the received commands to the CPU 132.

Figure 3:
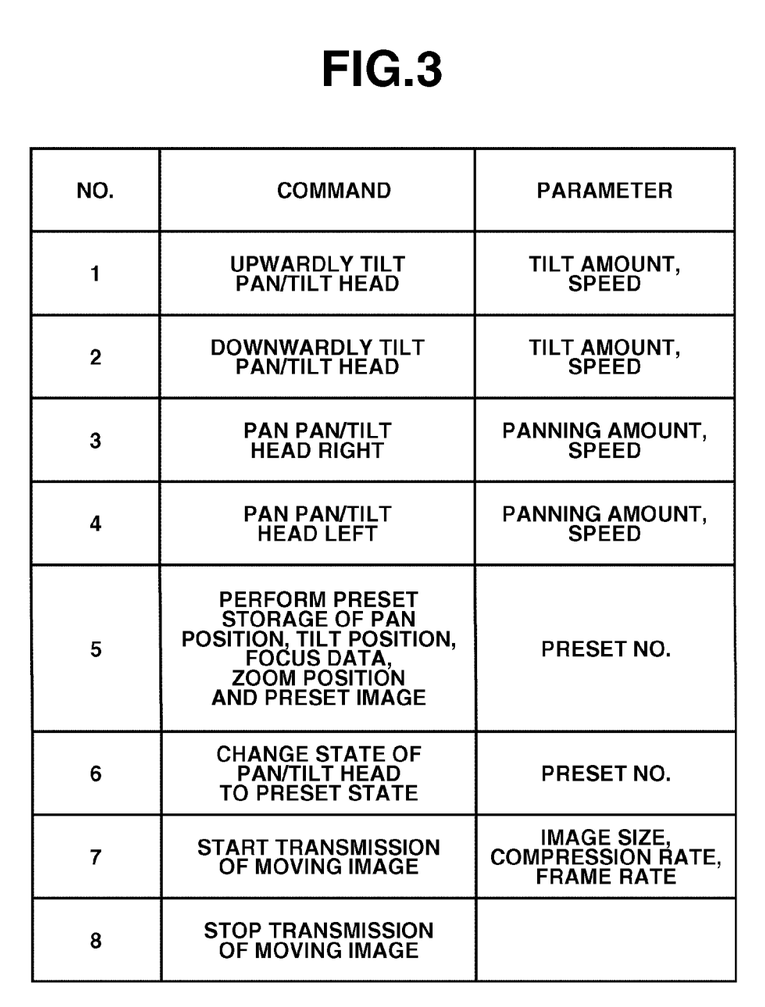
FIG. 3 illustrates an example control command adapted to control the pan/tilt head camera illustrated in FIG. 2.

FIG. 3 illustrates an exemplary control command adapted to control the pan/tilt head camera 10 or 20 illustrated in FIG. 2. A command No. 1 is defined to upwardly tilt the pan/tilt head 104. A tilt amount and a speed are set as parameters of this command. A command No. 2 is defined to downwardly tilt the pan/tilt head 104. A tilt amount and a speed are set as parameters of this command. A command No. 3 is defined to pan the pan/tilt head 104 right. A panning amount and a speed are set as parameters of this command.

A command No. 4 is defined to pan the pan/tilt head 104 left. A panning amount and a speed are set as parameters of this command. A command No. 5 is defined to perform preset storage of data representing a current camera status. The preset storage is performed by specifying a preset No., which is a parameter of this command, so as to store data representing a pan position of the pan/tilt head 104, a tilt position thereof, a focus state, such as an auto/manual mode and a focus position, a zoom position thereof, and a current image (preset image).

A command No. 6 is defined to change the state of pan/tilt, focus, and zoom of the pan/tilt head 104 to a preset state represented by a preset number serving as a parameter. A command No. 7 is defined to set an image size, a compression rate, and a frame rate, which are parameters of this command, and to start transmission of a moving image to a terminal that has sent this command. A command No. 8 is defined to stop the transmission of a moving image.

Figure 4:
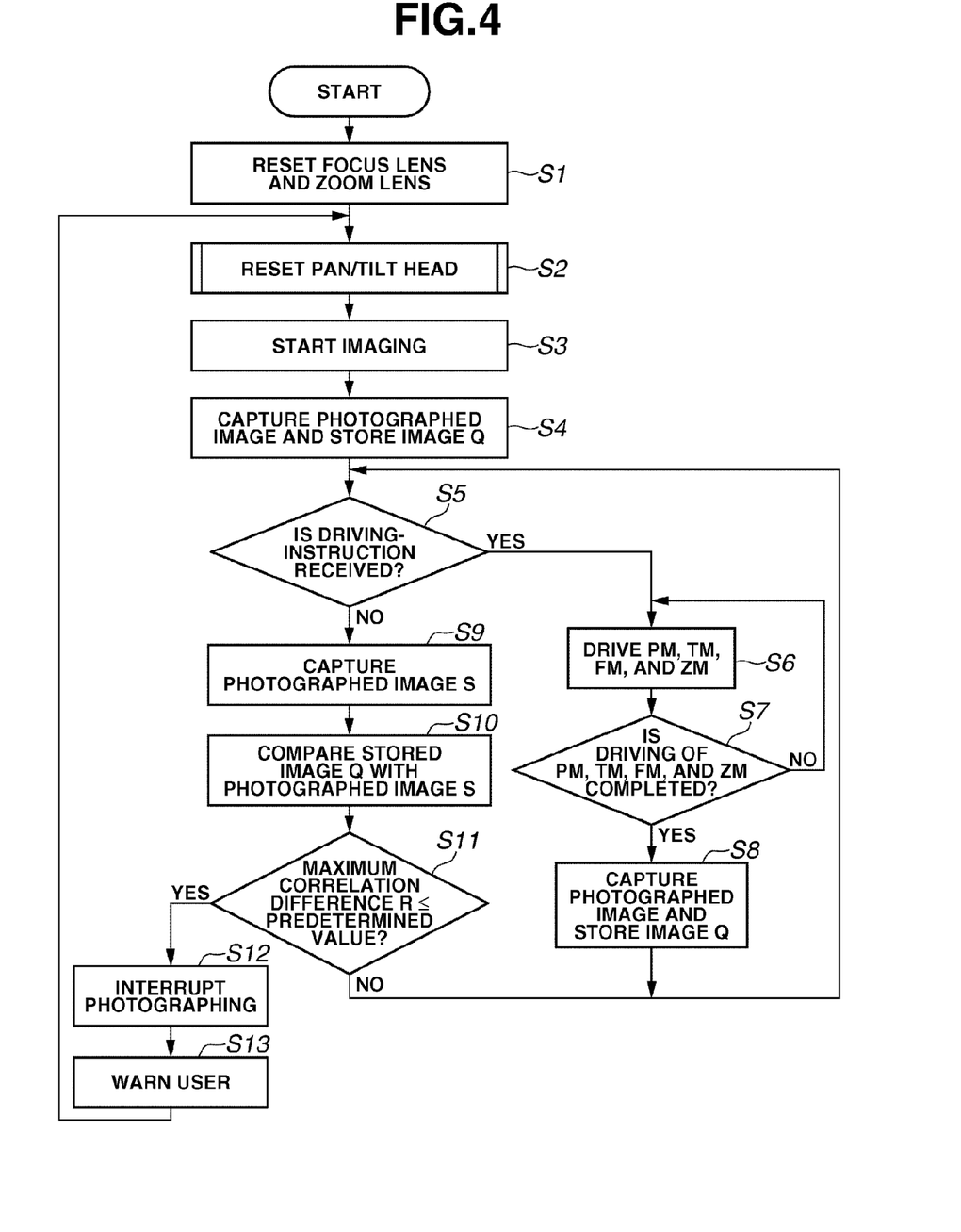
FIG. 4 illustrates an example flow of an imaging operation of the pan/tilt head camera illustrated in FIG. 2.

An imaging operation of the pan/tilt head camera 10 or 20 of the monitoring camera system having the above-described configuration is described below. FIG. 4 illustrates an exemplary flow of the imaging operation of the pan/tilt head camera 10 or 20 illustrated in FIG. 2. An associated processing program is stored in the recording media 156 in the base unit 103 and is executed by the CPU 151 in the base unit 103. First, in step S1, the CPU 151 issues an instruction to instruct the CPU 132 to perform a lens reset operation so as to manage absolute positions of the focus lens 113 and the zoom lens 111. When receiving this instruction, the CPU 132 causes the focus control unit 135 and the zoom control portion 137 to perform the lens reset operation. In step S2, the CPU 151 controls the pan/tilt control unit 166 to reset (initialize) the pan/tilt head 104 according to a pan/tilt head reset algorithm, which will be described below.

In step S3, the CPU 151 issues an instruction to instruct the CPU 132 to start imaging. When receiving this instruction, the CPU 132 causes the imaging control unit 133 to start imaging. In step S4, the CPU 151 captures a photographed image that is sent from the imaging unit 101 via the video IF 158 and that is photographed in a state in which the pan/tilt head 104 is not moved yet. Then, the CPU 151 stores the photographed image as a stored image Q in the recording media 156 or the RAM 154.

After the image Q is stored therein, in step S5, the CPU 151 determines whether the CPU 151 has received a pan/tilt head driving instruction among control commands transmitted from the monitor and control unit 30 and the recording server and control unit 40 via the network (LAN) 50. The pan/tilt driving instruction is a command typified by the command Nos. 1 through 4 illustrated in FIG. 3.

If the CPU 151 has received the pan/tilt head driving instruction (YES in step S5), then in step S6, the CPU 151 drives a necessary actuator according to the received driving instruction. In a case where the necessary actuator is the pan motor 167 or the tilt motor 163, the CPU 151 causes the pan/tilt control unit 166 to drive the pan motor 167 or the tilt motor 163. Alternatively, in a case where the necessary actuator is the zoom motor 121 or the focus motor 123, the CPU 151 instructs the CPU 132 to drive the zoom motor 121 or the focus motor 123.

In step S7, the CPU 151 determines whether the driving of all of the actuators, which have been started to be driven, is completed. If the driving is not yet completed (NO in step S7), the CPU 151 returns to step S6, in which the CPU 151 continues to drive the necessary actuator. On the other hand, if the driving is completed (YES in step S7), then in step S8, the CPU 151 captures a photographed image S at that time and stores the photographed image S in the recording media 156 or the RAM 154.

On the other hand, if the CPU 151 has not received the pan/tilt head driving instruction in step S5 (NO in step S5), then in step S9, the CPU 151 captures a photographed image S at a current position of the pan/tilt head 104. Then, in step S10, the CPU 151 compares the photographed image S with the image photographed at the initial position, which is stored as the image Q in step S4, or with the image photographed after the pan/tilt head 104 is driven, which is stored as the image Q in step S8, according to an image comparison algorithm, which will be described below.

In step S11, the CPU 151 determines, according to a result of comparing the photographed image S with the stored image Q, whether a maximum correlation difference R is equal to or less than a predetermined threshold value. If the maximum correlation difference R is greater than the predetermined threshold value (NO in step S11), the CPU 151 returns to step S5, in which the CPU 151 determines whether the CPU 151 has received a pan/tilt head driving instruction. On the other hand, if the maximum correlation difference R is equal to or less than the predetermined threshold value (YES in step S11), the CPU 151 determines that the position of the pan/tilt head 104 is deviated. Then, in step S12, the CPU 151 temporarily interrupts photographing. In addition, in step S13, the CPU 151 warns a user. After interrupting photographing, the CPU 151 returns to step S2, in which the CPU 151 resets (reinitializes) the pan/tilt head 104 again.

Just before resetting the pan/tilt head 104, the CPU 151 warns the user by, e.g., causing the monitor and control unit 30 to display a warning icon or a warning dialog via the network (LAN) 50, alternatively, issuing a warning command to the recording server and control unit 40 to make a record as a log. In a case where a warning command is issued to the monitor and control unit 30, the CPU 151 can ask a user to confirm whether to reset a pan/tilt operation. Such warning methods can be similarly applied to other exemplary embodiments, which will be described below.

Figure 5:
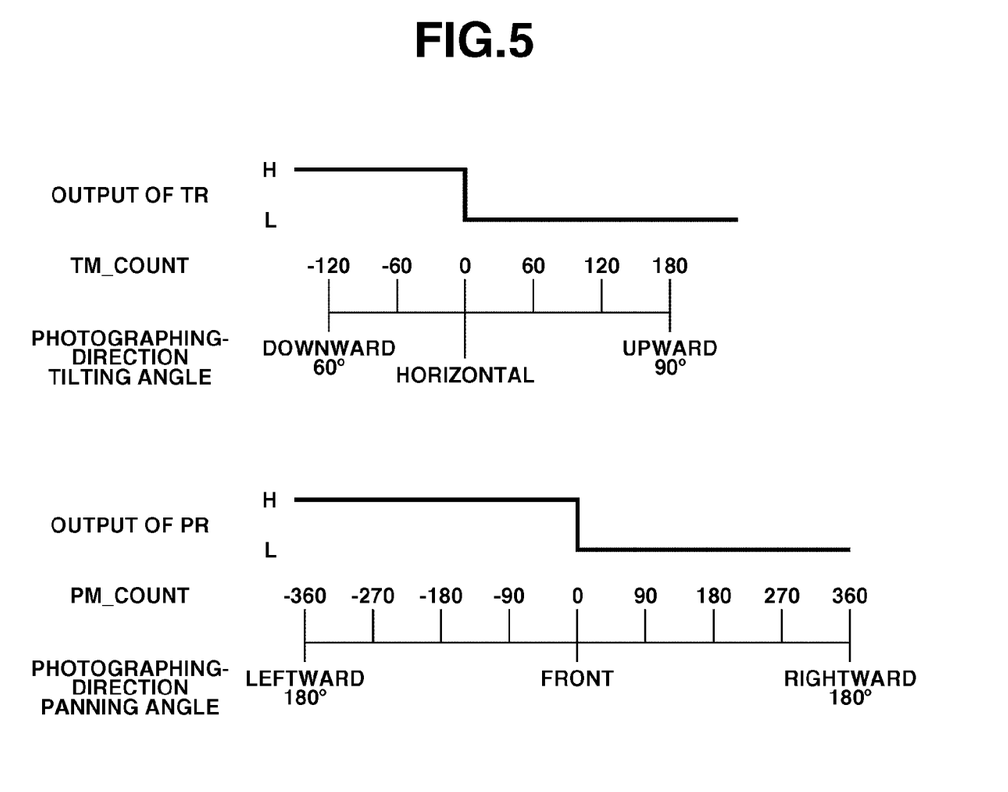
FIG. 5 illustrates changes of count values of counters and outputs of reset sensors of the pan/tilt head camera illustrated in FIG. 1.

FIG. 5 illustrates changes of count values of the counter 166a and outputs of the reset sensors 162 and 165 of the pan/tilt head camera 10 or 20 when a pan/tilt operation is performed. A tilt motor position control counter (hereunder sometimes referred to simply as a tilt counter) TM_COUNT is set in the counter 166a provided in the pan/tilt control unit 166. The tilt counter TM_COUNT is controlled by the pan/tilt control unit 166 and indicates a vertical (tilting) photographing direction angle. The value of the tilt counter TM_COUNT becomes 0 at a point at which the level of an output voltage of the tilt reset sensor (TR) 162 changes from an H-level to an L-level. The vertical photographing direction angle is 0 corresponding to a horizontal direction. In a case where the tilt counter TM_COUNT indicates a value corresponding to upward 90° that is a photographing direction angle, the value of the counter TM_COUNT is 180. In a case where the tilt counter TM_COUNT indicates a value corresponding to downward 60° that is a photographing direction angle, the value of the tilt counter TM_COUNT is –120.

A pan motor position control counter (hereunder sometimes referred to simply as a pan counter) PM_COUNT is set in the counter 166a provided in the pan/tilt control unit 166. The pan counter PM_COUNT is controlled by the pan/tilt control unit 166 and indicates a horizontal (panning) photographing direction angle. The value of the pan counter PM_COUNT becomes 0 at a point at which the level of an output voltage of the pan reset sensor (PR) 165 changes from an H-level to an L-level. The horizontal photographing direction angle is 0 corresponding to a front direction. In a case where the pan counter PM_COUNT indicates a value corresponding to rightward 180° that is a photographing direction angle, the value of the pan counter PM_COUNT is 360. In a case where the pan counter PM_COUNT indicates a value corresponding to leftward 180° that is a photographing direction angle, the value of the pan counter PM_COUNT is –360.

Figure 6:
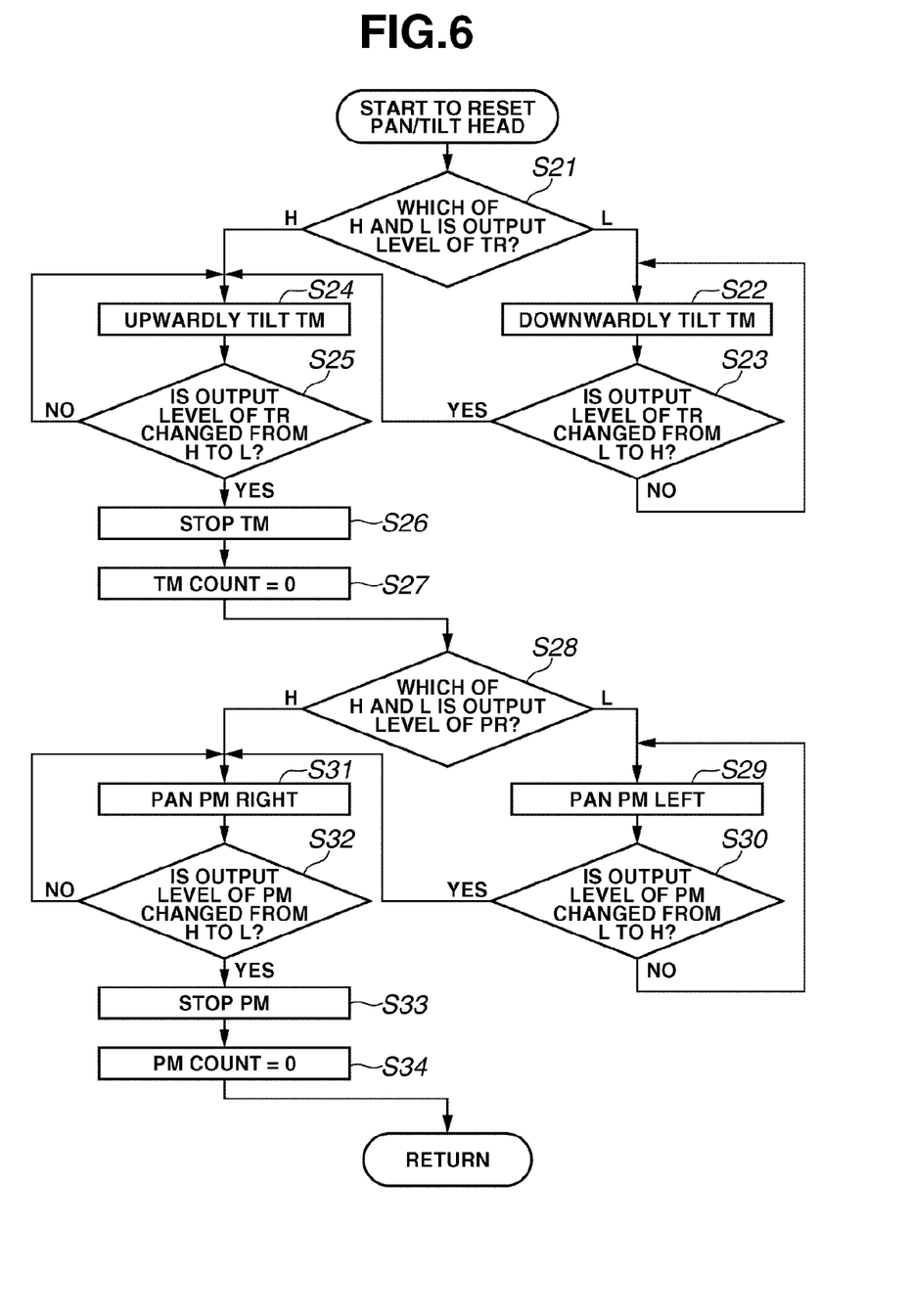
FIG. 6 illustrates an example flow of an operation of resetting the pan/tilt head according to a subroutine called in step S2 illustrated in FIG. 4.

FIG. 6 illustrates a flow of an operation of resetting the pan/tilt head 104 according to a subroutine called in step S2 illustrated in FIG. 4. First, in step S21, the CPU 151 monitors an output level of the tilt reset sensor (TR) 162 and determines which of the H-level and the L-level the output level of the tilt reset sensor (TR) 162 is.

If the output level of the tilt reset sensor (TR) 162 is the L-level (L in step S21), then in step S22, the CPU 151 controls the pan/tilt control unit 166 to drive the tilt motor 163 downwardly. In step S23, the CPU 151 determines whether the output level of the tilt reset sensor (TR) 162 has changed from the L-level to the H-level. If the output level of the tilt reset sensor (TR) 162 does not change from the L-level to the H-level (NO in step S23), the CPU 151 returns to step S22.

On the other hand, if the output level of the tilt reset sensor (TR) 162 has changed from the L-level to the H-level (YES in step S23), then in step S24, the CPU 151 controls the pan/tilt control unit 166 to drive the tilt motor 163 upwardly. In a case where the CPU 151 determines in step S21 that the output level of the tilt reset sensor (TR) 162 is the H-level (H in step S21), the CPU 151 similarly controls the pan/tilt control unit 166 to drive the tilt motor 163. In step S25, the CPU 151 determines whether the output level of the tilt reset sensor (TR) 162 has changed from the H-level to the L-level. If the output level of the tilt reset sensor (TR) 162 does not change from the H-level to the L-level (NO in step S25), the CPU 151 returns to step S24.

On the other hand, if the output level of the tilt reset sensor (TR) 162 has changed from the H-level to the L-level (YES in step S25), then in step S26, the CPU 151 stops the tilt motor 163. Then, in step S27, the CPU 151 enters a value of 0 into the tilt counter TM_COUNT. Consequently, the tilt counter TM_COUNT is reset.

In step S28, the CPU 151 monitors an output level of the pan reset sensor (PR) 165 and determines which of the H-level and the L-level the output level of the pan reset sensor (PR) 162 is. If the output level of the pan reset sensor (PR) 165 is the L-level (L in step S28), then in step S29, the CPU 151 controls the pan/tilt control unit 166 to drive the tilt motor 163 leftwardly. In step S30, the CPU 151 determines whether the output level of the pan reset sensor (PR) 165 has changed from the L-level to the H-level. If the output level of the pan reset sensor (PR) 165 does not change from the L-level to the H-level (NO in step S30), the CPU 151 returns to step S29.

On the other hand, if the output level of the pan reset sensor (PR) 165 has changed from the L-level to the H-level (YES in step S30), then in step S31, the CPU 151 controls the pan/tilt control unit 166 to drive the pan motor 167 rightwardly. In a case where the CPU 151 determines in step S28 that the output level of the pan reset sensor (PR) 165 is the H-level (H in step S28), the CPU 151 similarly controls the pan/tilt control unit 166 to drive the pan motor 165. In step S32, the CPU 151 determines whether the output level of the pan reset sensor (PR) 165 has changed from the H-level to the L-level. If the output level of the pan reset sensor (PR) 165 does not change from the H-level to the L-level (NO in step S32), the CPU 151 returns to step S31.

On the other hand, if the output level of the pan reset sensor (TR) 165 has changed from the H-level to the L-level (YES in step S32), then in step S33, the CPU 151 stops the pan motor 167. Then, in step S34, the CPU 151 enters a value of 0 into the pan counter PM_COUNT. Consequently, the pan counter PM_COUNT is reset. Then, the CPU 151 terminates the operation of resetting and returns to the operation of imaging illustrated in FIG. 4.

Figure 7:
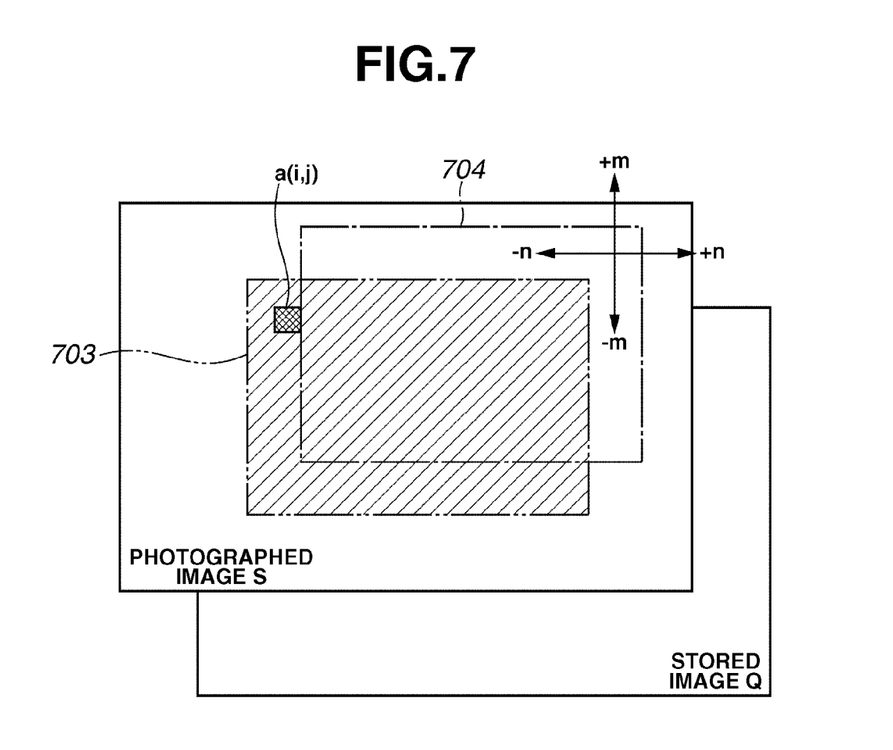
FIG. 7 illustrates comparison between a photographed image and a stored image.

FIG. 7 illustrates comparison between the photographed image S and the stored image Q. In the following description, a specific pixel positioned at coordinates (i, j) in a comparison area (indicated as a shaded portion in FIG. 7) 703 of the photographed image S is represented by "a(i, j)". A luminance value at the pixel a(i, j) is represented by "s (i,j)". A luminance value at a pixel of the stored image Q, which is placed at the same position as that of the pixel a(i,j) of the photographed image S, is represented by "q(i,j)".

First, the luminance value s(i,j) at each of all pixels a(i,j) in the comparison area 703 of the photographed image S is compared with that q(i,j) at an associated pixel of the stored image Q, which has the same position as that of the pixel a(i,j) in the comparison area 703. At that time, a correlation value L given by the following equation (1) is calculated:

$$L(n,m)=\Sigma(s(i,j)-q(i+n,j+m))^2 \quad (1)$$

where n=±0, 1, ..., N, and m=±0, 1, ..., M. According to the equation (1), the square of a difference between the luminance value s(i,j) and the luminance value q(i,j) is summed over all pixels included in the comparison area 703. Further, L(0,0) is obtained as the correlation value L in a case where n=0 and m=0.

Then, the correlation values L(n,m) are obtained by incrementing and decrementing individual two-dimensional parameters n and m by the predetermined number of pixels. FIG. 7 illustrates the comparison area 704 shifted by n in an X-direction and by m in a Y-direction. The correlation values L(n,m) are calculated in a range in which the parameter n varies from 0 to ±N and the parameter m varies from 0 to ±M. The difference between the maximum value and the minimum value of the calculated correlation values L(n,m) is obtained as a maximum correlation difference R.

Figure 8A:
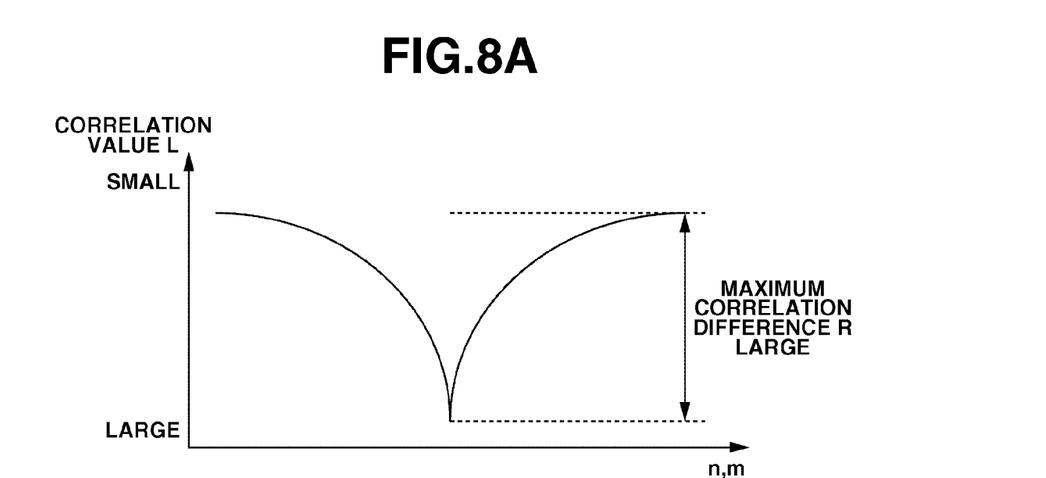
FIGS. 8A and 8B illustrate maximum correlation differences.
Figure 8B:
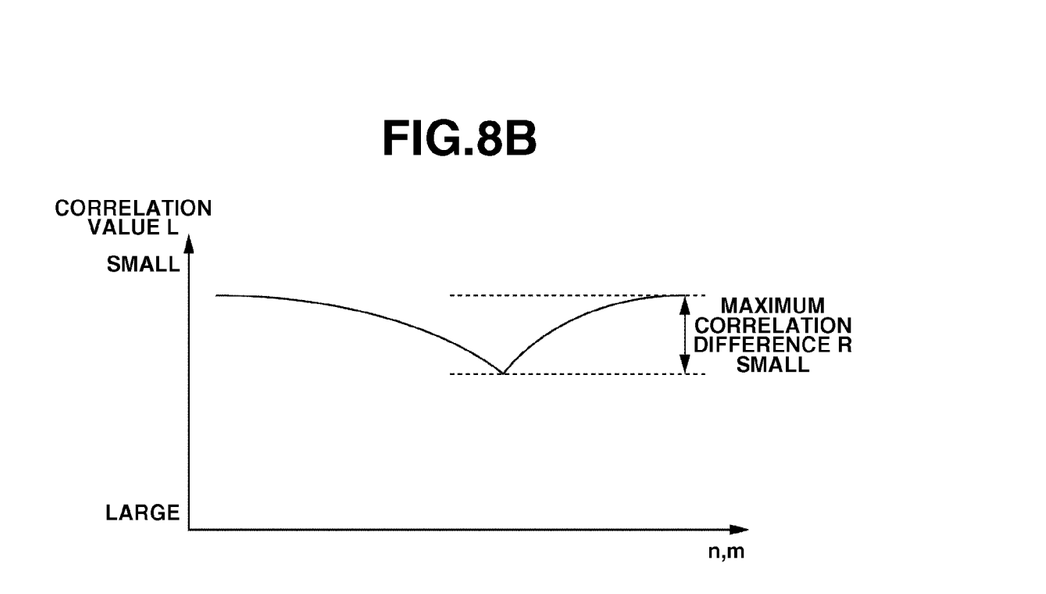

FIGS. 8A and 8B illustrate maximum correlation differences R one-dimensionally, for simplicity of description. However, actually, the maximum correlation differences R change two-dimensionally. FIG. 8A illustrates a case where the maximum correlation difference R is large. FIG. 8B illustrates a case where the maximum correlation difference R is small.

As the degree of matching between the two images S and Q increases, the correlation value L becomes smaller. As the degree of matching between the two images S and Q decreases, the correlation value L becomes larger. Accordingly, in a case where a stored image Q corresponding to a high degree of matching with the photographed image S is present in the range in which the parameter n varies from 0 to ±N and the parameter m varies from 0 to ±M, the maximum correlation difference R is large. Conversely, in a case where no stored image Q corresponding to a high degree of matching with the photographed image S is present in the range in which the parameter n varies from 0 to ±N and the parameter m varies from 0 to ±M, the maximum correlation difference R is small.

The maximum correlation difference R is used to determine the degree of matching between the images Q and S for the following reason. In a case where the stored image Q completely matches the photographed image S, the correlation value therebetween can be determined by calculating only L(0,0) However, actually, the stored image Q does not completely match the photographed image S due to an error in position at which the pan/tilt head 104 stops and to a shake caused by wind or vibrations. Consequently, the degree of matching between the images Q and S is evaluated using the maximum correlation difference R. Accordingly, the comparison between the images Q and S can be performed with ease and accuracy.

Various methods can be used to calculate the correlation value between the two images R and S. The present exemplary embodiment describes only one example. The present invention is not limited to the method of calculating the correlation according to the present exemplary embodiment.

Thus, the monitoring camera system according to the present exemplary embodiment can prevent a photographing operation from being performed in a state in which the pan/tilt head is deviated and in which the imaging unit (e.g., the camera) supported by the pan/tilt head is directed to an unintended photographing direction. The monitoring camera system according to the present exemplary embodiment can correct a photographing direction of the camera even when the camera is directed to an unintended photographing direction by manually moving the pan/tilt head or by catching the pan/tilt head in something. A device for positioning the pan/tilt head has an inexpensive structure using only a stepping motor and a reset switch (alternatively, an encoder). Thus, the reliability of the pan/tilt head can be enhanced. Further, a user can know an occurrence of abnormality of control of the pan/tilt head before the position of the pan/tilt head is reset. In addition, the monitoring camera system according to the present exemplary embodiment can prevent an imaging operation from being performed in a state in which the camera is directed to an unintended photographing direction.

Second Exemplary Embodiment

Hereinafter, a second exemplary embodiment of the present invention describes a case of performing preset photographing. When a preset position is set, an image P preliminarily photographed at the preset position is registered in the RAM 154 or recording media 156. A monitoring camera system according to the second exemplary embodiment has a configuration that is similar to the configuration of the monitoring camera system according to the first exemplary embodiment. Therefore, the description of the configuration of the second exemplary embodiment is omitted by designating components thereof with reference numerals used in the description of the first exemplary embodiment. Driving instructions (commands), a method for resetting the pan/tilt head 104, and a method for obtaining the maximum correlation difference R according to the second exemplary embodiment are similar to those used in the first exemplary embodiment.

Figure 9:
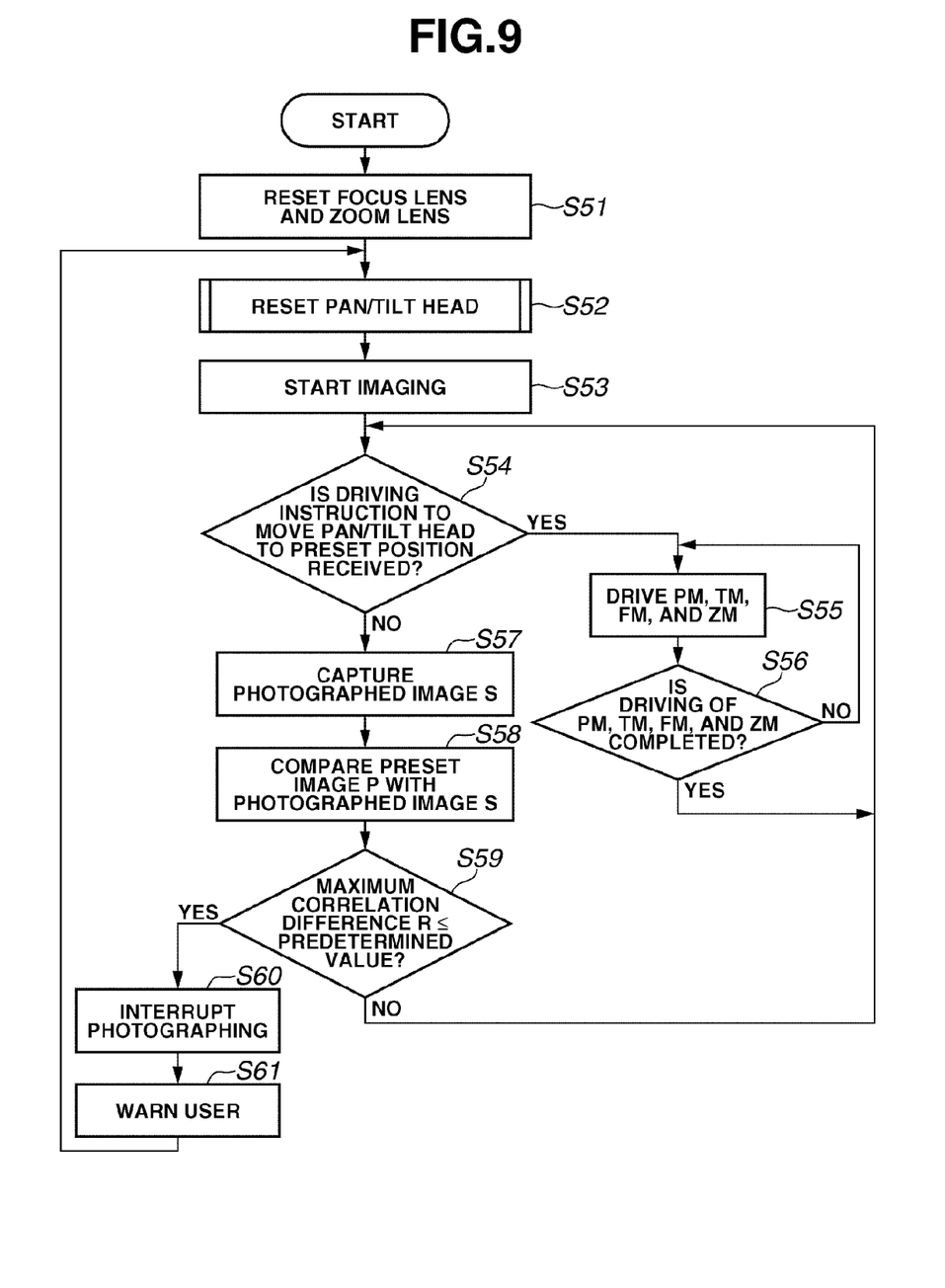
FIG. 9 illustrates an example flow of an imaging operation of a pan/tilt head camera of a monitoring camera system according to a second exemplary embodiment of the present invention.

FIG. 9 illustrates an example flow of an imaging operation of the pan/tilt head camera of the monitoring camera system according to the second exemplary embodiment of the present invention. An associated processing program is stored in the recording media 156 provided in the base unit 103 and executed by the CPU 151 provided in the base unit 103. In step S51, the CPU 151 issues an instruction to instruct the CPU 132 to perform a lens reset operation so as to control absolute positions of the focus lens 113 and the zoom lens 111. When receiving this instruction, the CPU 132 causes the focus control unit 135 and the zoom control portion 137 to perform the lens reset operation. In step S52, the CPU 151 controls the pan/tilt control unit 166 to reset the pan/tilt head 104 according to a pan/tilt head reset algorithm.

In step S53, the CPU 151 instructs the CPU 132 to start imaging. When receiving this instruction, the CPU 132 causes the imaging control unit 133 to start imaging.

In step S54, the CPU 151 determines whether the CPU 151 has received an instruction to drive the pan/tilt head 104 to the preset position among control commands transmitted from the monitor and control unit 30 and the recording server and control unit 40 via the network (LAN) 50. The instruction to drive the pan/tilt head 104 to the preset position (hereunder referred to simply as a driving-to-the-preset-position instruction) is the command No. 6 illustrated in FIG. 3.

If the CPU 151 has received the driving-to-the-preset-position instruction (YES in step S54), then in step S55, the CPU 151 drives a necessary actuator (e.g., the pan motor 167, the tilt motor 163, the focus motor 123, or the zoom motor 121) according to the received driving-to-the-preset-position instruction. In a case where the necessary actuator is the pan motor 167 or the tilt motor 163, the CPU 151 causes the pan/tilt control unit 166 to drive the pan motor 167 or the tilt motor 163. Alternatively, in a case where the necessary actuator is the zoom motor 121 or the focus motor 123, the CPU 151 instructs the CPU 132 to drive the zoom motor 121 or the focus motor 123.

In step S56, the CPU 151 determines whether the driving of all of the actuators, which have been started to be driven, is completed. If the driving is not yet completed (NO in step S56), the CPU 151 returns to step S55, in which the CPU 151 continues to drive the necessary actuator. On the other hand, if the driving is completed (YES in step S56), the CPU 151 returns to step S54.

If the CPU 151 has not received the driving-to-the-preset-position instruction in step S54 (NO in step S54), then in step S57, the CPU 151 captures a photographed image S at a current position of the pan/tilt head 104 and stores the photographed image S in the recording media 156 or RAM 154. The photographed image S is sent from the imaging unit 101 via the video IF 158.

Then, in step S58, the CPU 151 compares the photographed image S, stored in step S57, with the preset image P according to an image comparison algorithm that is similar to the image comparison algorithm used in the first exemplary embodiment.

In step S59, the CPU 151 determines, according to a result of comparing the photographed image S with the preset image P, whether a maximum correlation difference R is equal to or less than a predetermined threshold value. If the maximum correlation difference R is greater than the predetermined threshold value (NO in step S59), the CPU 151 returns to step S54, in which the CPU 151 determines whether the CPU 151 has received the driving-to-the-preset-position instruction. On the other hand, if the maximum correlation difference R is equal to or less than the predetermined threshold value (YES in step S59), the CPU 151 determines that the position of the pan/tilt head 104 is deviated. Then, in step S60, the CPU 151 temporarily interrupts photographing. In addition, in step S61, the CPU 151 warns a user. Subsequently, the CPU 151 returns to step S52, in which the CPU 151 resets the pan/tilt head 104 again.

Thus, the monitoring camera system according to the second exemplary embodiment can prevent a photographing operation from being performed in a state in which the pan/tilt head is deviated and in which the imaging unit (e.g., the camera) supported by the pan/tilt head is directed to an unintended photographing direction.

Third Exemplary Embodiment

Hereinafter, a third exemplary embodiment of the present invention describes a case of moving, when it is determined that an imaging unit (camera) is directed to an unintended photographing direction, the imaging unit (camera) to a preset position and comparing images with each other again. A monitoring camera system according to the third exemplary embodiment has a configuration that is similar to the configuration of the monitoring camera system according to the first exemplary embodiment. Therefore, the description of the configuration of the third exemplary embodiment is not repeated by designating components thereof with reference numerals used in the description of the first exemplary embodiment. Driving instructions (or commands), a method for resetting the pan/tilt head 104, and a method for obtaining the maximum correlation difference R according to the third exemplary embodiment are similar to those used in the first exemplary embodiment. Additionally, when preset positions for performing preset photographing are set, at least one preset position and an image P photographed at the preset position are preliminarily registered in the RAM 154 or recording media 156.

Figure 10:
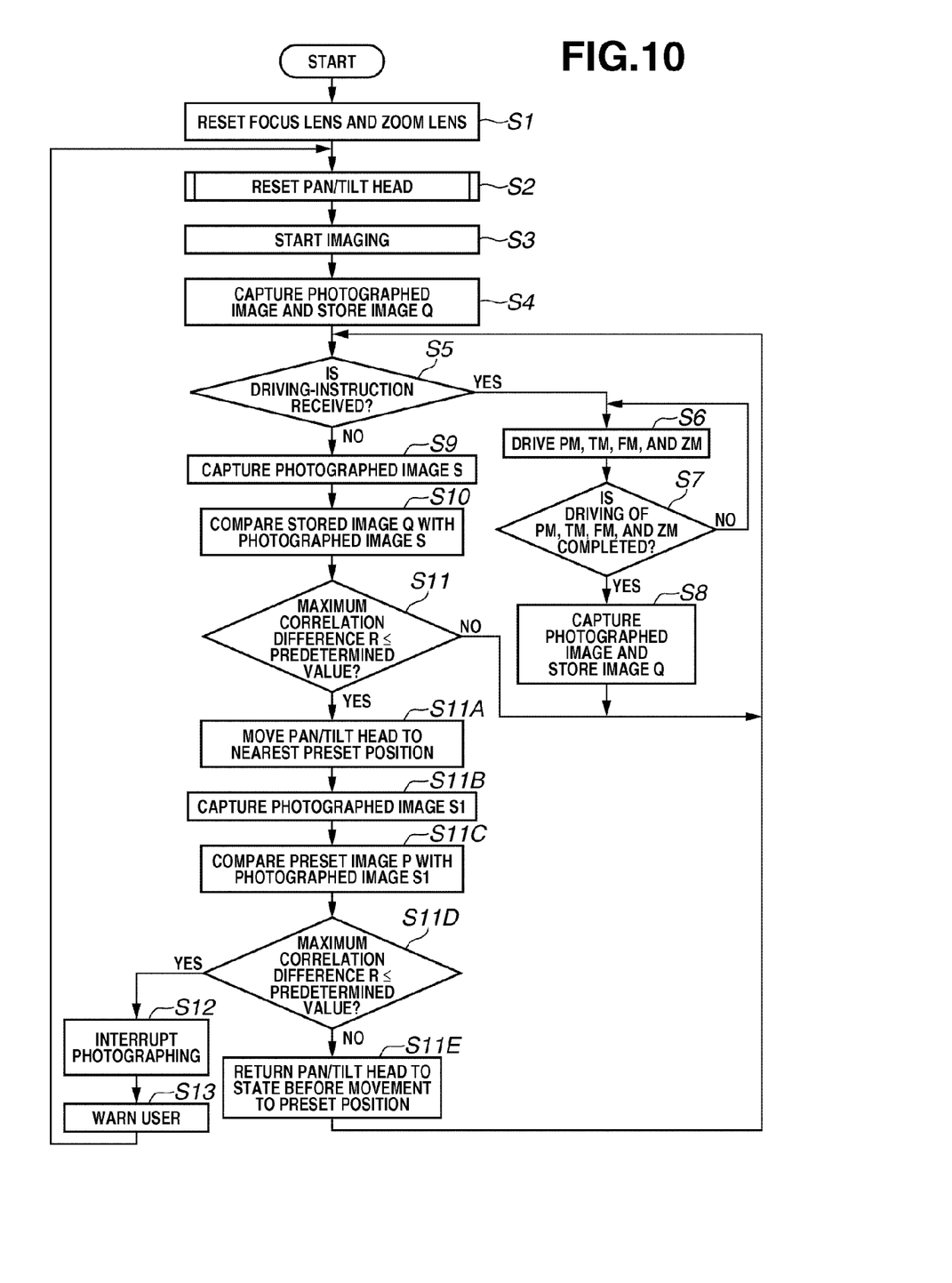
FIG. 10 illustrates an example flow of an imaging operation of a pan/tilt head camera of a monitoring camera system according to a third exemplary embodiment of the present invention.

FIG. 10 illustrates an exemplary flow of an imaging operation of the pan/tilt head camera of a monitoring camera system according to the third exemplary embodiment of the present invention. An associated processing program is stored in the recording media 156 provided in the base unit 103 and is executed by the CPU 151 provided in the base unit 103. The description of steps, which are similar to those according to the first exemplary embodiment, is omitted by designating each of such steps with the same reference step number used in the first exemplary embodiment.

If the CPU 151 determines in step S11, as a result of comparing the photographed image S with the stored image Q in step S10, that the maximum correlation difference R is equal to less than a predetermined threshold value (YES in step S11), then in step S11A, the CPU 151 moves the pan/tilt head 104 to a preset position, the movement distance from a current position thereof in a photographing direction to which is shortest.

Then, in step S11B, the CPU 151 captures a photographed image S at the current position of the pan/tilt head 104. In step S11C, the CPU 151 compares the photographed image S with a preliminarily registered preset image P according to an image comparison algorithm that is similar to the image comparison algorithm used in step S10 in the first exemplary embodiment.

In step S11D, the CPU 151 determines, according to a result of comparing the photographed image S with the preset image P, whether the maximum correlation difference R is equal to or less than the predetermined threshold value. If the maximum correlation difference R is greater than the predetermined threshold value (NO in step S11D), then in step S11E, the CPU 151 returns the pan/tilt head back 104 to a state in which the pan/tilt head 104 is put before being moved to the preset position in step S11A. Subsequently, the CPU 151 returns to step S5.

On the other hand, if it is determined in step S11D that the maximum correlation difference R is equal to or less than the predetermined threshold value (YES in step S11D), then in step S12, the CPU 151 temporarily interrupts photographing. In step S13, the CPU 151 warns a user. Then, the CPU 151 returns to step S2, in which the CPU 151 resets the pan/tilt head 104 again.

Thus, the monitoring camera system according to the third exemplary embodiment can confirm a photographing direction of the camera by moving, in a case where the imaging unit (camera) is deviated in an unintended photographing direction, the pan/tilt head to a nearest preset position. Consequently, the monitoring camera system according to the third exemplary embodiment can quickly deal with such a case. Further, the monitoring camera system according to the third exemplary embodiment is effective not only in a case of performing preset photographing, but in a case of manually controlling the pan/tilt head.

The present invention is not limited to the above-described exemplary embodiments. The present invention can be applied not only to a monitoring camera system in which a camera is remotely controlled via a network and a dedicated line and images photographed by the camera are monitored, but to digital still cameras and digital video cameras.

The present invention can be achieved by performing the following processing. A storage medium, on which software program code implementing the functions of the above-described exemplary embodiments is recorded, is supplied to a system or apparatus. Then, the program code stored in the storage medium is read and executed by a computer (or a CPU or a micro-processing unit (MPU)) of the system or apparatus.

In this case, the program code itself read from the storage medium implements the functions of the above-described exemplary embodiments. The program code itself and the storage medium, on which the program code is recorded, constitute the present invention.

The following storage media can be used as the recording media for supplying the program code. For example, a floppy disk, a hard disk, a magneto-optical disk, a compact disc read-only memory (CD-ROM), a compact disc-recordable (CD-R), a compact disc-rewritable (CD-RW), a digital versatile disc read-only memory (DVD-ROM), a digital versatile disc random access memory (DVD-RAM), a digital versatile disc-rewritable (DVD-RW), a digital versatile disc+rewritable (DVD+RW), a magnetic tape, a nonvolatile semiconductor memory, and a read-only memory (ROM) can be used.

The functions of the above-described exemplary embodiments can be implemented by executing the read program code by a computer and by performing part or all of actual processing operations using an operating system (OS) or the like running on the computer according to an instruction represented by the program code.

The functions of the above-described exemplary embodiments can be implemented by performing the following processing. The program code read from the storage medium is written to a memory provided on a function expansion board inserted into a computer or in a function expansion unit connected to a computer. Subsequently, part or all of actual processing operations using a CPU or the like provided on the function expansion board or in the function expansion unit is performed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-100918 filed Apr. 6, 2007, which is hereby incorporated by reference herein in its entirety.

What is claimed is:

1. An imaging apparatus comprising:
   an imaging unit configured to acquire a photographed image from an optical image;
   a pan/tilt head configured to support the imaging unit;
   a drive unit configured to drive the pan/tilt head using a stepping motor with an initial position of the pan/tilt head set as a reference position;
   a detecting unit configured to detect whether the pan/tilt head is at the initial position or not using a sensor;
   a control unit configured to control the drive unit based on a control value which is a value of driving pulses of the stepping motor from the initial position, wherein the control value is reset when the detecting unit detects that the pan/tilt head is at the initial position;
   an image storage unit configured to store, as a registered image, a photographed image acquired by the imaging unit when the detecting unit detects that the pan/tilt head is located at the initial position; and
   an image comparison unit configured to compare a photographed image newly acquired by the imaging unit with the registered image stored in the image storage unit, wherein the image comparison unit repeatedly performs the comparison until the control unit receives a driving instruction for driving the pan/tilt head,
   wherein the drive unit drives the pan/tilt head to the initial position based on a result of a detection by the detecting unit and the control unit resets the control value if, as a result of comparison made by the image comparison unit, it is determined that a degree of matching between the photographed image and the registered image satisfies a predetermined condition.

2. The imaging apparatus according to claim 1,
   wherein the image storage unit stores, as a registered image, the photographed image acquired by the imaging unit when the pan/tilt head is stopped at the initial position, and
   wherein the image comparison unit compares a photographed image newly acquired by the imaging unit with the registered image stored in the image storage unit.

3. The imaging apparatus according to claim 1,
   wherein the image comparison unit compares a photographed image newly acquired by the imaging unit with the registered image stored in the image storage unit when the pan/tilt head is not driven after the registered image is stored in the image storage unit.

4. The imaging apparatus according to claim 1, further comprising a warning unit configured to generate a warning before the pan/tilt head is driven to the initial position again by the drive unit.

5. The imaging apparatus according to claim 1, further comprising a photographing interruption unit configured to interrupt the imaging unit from acquiring a photographed image before the pan/tilt head is driven to the initial position again by the drive unit.

6. The imaging apparatus according to claim 1, wherein the image comparison unit performs, when comparing the photographed image with the registered image, a correlation operation on the photographed image and the registered image while shifting a comparison area set in each of the photographed image and the registered image, and wherein, if a result of the correlation operation indicates that a difference between a maximum value and a minimum value of a correlation value is equal to or less than a threshold value, the image comparison unit determines that the degree of matching between the photographed image and the registered image satisfies the predetermined condition.

7. An imaging control apparatus for controlling an imaging apparatus having an imaging unit configured to acquire a photographed image from an optical image, a pan/tilt head configured to support the imaging unit, and a drive unit configured to drive the pan/tilt head with an initial position of the pan/tilt head set as a reference position, the imaging control apparatus comprising:
   an image storage unit configured to store, as a registered image, a photographed image acquired by the imaging unit in a storage device when the pan/tilt head is located at the initial position;
   an image comparison unit configured to compare a photographed image newly acquired by the imaging unit with the registered image stored in the storage device, wherein the image comparison unit repeatedly performs the comparison until the control unit receives a driving instruction for driving the pan/tilt head; and a control unit configured to control the drive unit based on a control value which is a value of driving pulses of a stepping motor from the initial position, wherein the control value is reset when a detecting unit detects that the pan/tilt head is at the initial position, wherein the drive unit drives the pan/tilt head to the initial position and the control unit resets the control value if, as a result of comparison made by the image comparison unit, it is determined that a degree of matching between the photographed image and the registered image satisfies a predetermined condition.

8. A method for controlling an imaging apparatus including a camera configured to acquire a photographed image from an optical image, and a pan/tilt head configured to support the camera, the method comprising:

driving the pan/tilt head with an initial position of the pan/tilt head set as a reference position;

detecting whether the pan/tilt head is at the initial position or not using a sensor;

controlling the drive unit based on a control value which is a value of driving pulses of the stepping motor from the initial position, wherein the control value is reset when the detecting unit detects that the pan/tilt head is at the initial position;

storing, as a registered image, a photographed image acquired by the imaging unit when the pan/tilt head is located at the initial position;

comparing a photographed image newly acquired by the camera with the registered image stored in the recording medium, wherein the comparison is repeatedly performed until a driving instruction for driving the pan/tilt head is received; and driving the pan/tilt head to the initial position based on a result of a detection whether the pan/tilt head is at the initial position or not and resetting the control value if, as a result of the comparison, it is determined that a degree of matching between the photographed image and the registered image satisfies a predetermined condition.

9. A non-transitory computer readable medium containing computer-executable instructions for causing a computer provided in an imaging apparatus to control the imaging apparatus including a camera configured to acquire a photographed image from an optical image, and a pan/tilt head configured to support the camera, the computer readable medium comprising:

computer-executable instructions for driving the pan/tilt head with an initial position of the pan/tilt head set as a reference position;

computer-executable instructions for detecting whether the pan/tilt head is at the initial position or not using a sensor;

computer-executable instructions for controlling the drive unit based on a control value which is a value of driving pulses of the stepping motor from the initial position, wherein the control value is reset when the detecting unit detects that the pan/tilt head is at the initial position;

computer-executable instructions for storing, as a registered image, a photographed image acquired by the camera when the pan/tilt head is located the initial position;

computer-executable instructions for comparing a photographed image newly acquired by the camera with the registered image stored in the recording medium, wherein the comparison is repeatedly performed until a driving instruction for driving the pan/tilt head is received; and computer-executable instructions for driving the pan/tilt head to the initial position based on a result of a detection whether the pan/tilt head is at the initial position or not and resetting the control value if, as a result of the comparison, it is determined that a degree of matching between the photographed image and the registered image satisfies a predetermined condition.

* * * * *